(12) United States Patent
Rom

(10) Patent No.: US 6,307,568 B1
(45) Date of Patent: Oct. 23, 2001

(54) VIRTUAL DRESSING OVER THE INTERNET

(75) Inventor: Ehud Rom, Misgav (IL)

(73) Assignee: Imaginarix Ltd.

( * ) Notice: Subject to any disclaimer, the term of this patent is extended or adjusted under 35 U.S.C. 154(b) by 0 days.

(21) Appl. No.: 09/179,826

(22) Filed: Oct. 28, 1998

(51) Int. Cl.$^7$ .................................................. G06T 17/00
(52) U.S. Cl. ......................... 345/629; 345/630; 345/632; 345/633; 345/634
(58) Field of Search ................................... 345/634, 619, 345/629, 630, 632, 676, 633

(56) References Cited

U.S. PATENT DOCUMENTS

| | | | | |
|---|---|---|---|---|
| 4,261,012 | * | 4/1981 | Maloomian | 358/93 |
| 4,539,585 | * | 9/1985 | Sppackova et al. | 358/93 |
| 4,546,434 | * | 10/1985 | Gioello | 364/300 |
| 4,598,376 | * | 7/1986 | Burton et al. | 364/470 |
| 5,163,006 | * | 11/1992 | Deziel | 364/470 |
| 5,163,007 | * | 11/1992 | Slilaty | 364/470 |
| 5,247,610 | * | 9/1993 | Oshima et al. | 395/135 |
| 5,495,568 | * | 2/1996 | Beavin | 395/161 |
| 5,530,652 | * | 6/1996 | Croyle et al. | 364/470 |
| 5,680,528 | * | 10/1997 | Korszun | 395/135 |
| 5,850,222 | * | 12/1998 | Cone | 345/418 |
| 5,930,769 | * | 7/1999 | Rose | 705/27 |

* cited by examiner

Primary Examiner—Matthew Luu
Assistant Examiner—Daniel J Chung
(74) Attorney, Agent, or Firm—Mark M. Friedman

(57) ABSTRACT

A method and a system for displaying garments over the Internet as though th garments were being draped over the body of a user. The method and system of the present invention fits articles of clothing to an image of a user over the Internet. The image of the user is derived from a picture of the user. Critical points are taken from the image of the user, and are used to adjust the spatial configuration of the clothing. The critical points within the volume of the article of clothing are adjusted to match the critical points of the image of the body of the user, such that the spatial configuration of the article of clothing matches the configuration which would be adopted if the user was actually wearing the article of clothing. The adjusted garment image is combined with the user image and is displayed.

13 Claims, 3 Drawing Sheets

VIRTUAL DRESSING OVER THE INTERNET

FIELD AND BACKGROUND OF THE INVENTION

The present invention relates to a system and a method for fitting articles of clothing to an image of a user over the Internet, and more particularly, to an automatic system and a method for fitting articles of clothing on a real image of the user.

Electronic commerce through the Internet is increasing exponentially. Computer users are able to purchase goods and services through the Internet, often placing such purchases through the Web site of a vendor. One difficulty inherent with clothing purchases over the Internet is the inability to try the clothing on before it is purchased. A user would obviously prefer to be able to try on the article of clothing before purchase, to examine the fit and size of the article of clothing on the body of the individual user.

A number of solutions have been proposed to overcome this drawback for purchasing clothing through the Internet. For example, a software package from ModaCAD™ is only able to show clothing on a stylized mannequin and not on an image of the user.

U.S. Pat. No. 5,680,528 discloses a software program which fits a set of dimensions of the user into one of a predetermined set of models of the human body. The particular characteristics which make each individual unique are lost in this transition. For example, if a user had a slightly crooked back, this back would be straightened to the "normative" model. The disclosed program also moves the body of the user to fit the clothing model. For example, if the hands of the user are not in the appropriate position for the modeled clothes, then the software moves the hands accordingly. Furthermore, the software requires manual intervention to obtain a good fit of the dimensions of the body of the user to the model. Thus, the software disclosed in U.S. Pat. No. 5,680,528 clearly has many drawbacks.

Therefore, there is an unmet need for, and it would be highly useful to have, a method and a system which displays an image of an article of clothing as it would appear on the body of the user, according to the dimension of the body of the user, without requiring the dimensions of the user to be altered to fit a pre-existing model.

SUMMARY OF THE INVENTION

The present invention is of a system and a method for fitting articles of clothing to an image of a user over the Internet. The image of the user is derived from a photograph or photographs of the user, from a videostream, and/or from additional information about the user. Critical points are taken from the image of the user, and are used to adjust the spatial configuration of the clothing. The critical points within the volume of the article of clothing are adjusted to match the critical points of the image of the body of the user, such that the spatial configuration of the article of clothing matches the configuration which would be adopted if the user was actually wearing the article of clothing. Thus, rather than first creating a model and then attempting to drape the image of the clothing over the model, the spatial configuration of the clothing alone is determined and adjusted to fit the body of each user.

The system and method of the present invention enable users in remote are as to try on the extensive collection of garments available from different vendors through the Internet. In addition, many different garments can be examined rapidly, thereby potentially increasing sales to the vendor and saving time for the user. The ability to examine an accurately depicted image of the garment as worn by the user also has the potential to minimize the number of articles of clothing returned to the vendor. Garments can also be fitted for someone other than the user, which is a particular advantage when buying garments for persons who have difficulty selecting their own garments, such as children. Thus, the system and method of the present invention combine the "shopping experience" of examining clothing for purchase with the convenience of electronic commerce.

The system and method described herein have the advantage of being relatively rapid, which is particularly important for electronic commerce through the Internet. Furthermore, the system and method described herein are substantially automatic. Thus, the system and method of the present invention is particularly suitable for electronic commerce through the Internet.

According to the present invention, there is provided a method for trying on garment through the Internet by a user, the steps of the method being performed according to software commands being executed by a data processor, the method comprising the steps of: (a) providing a picture of a body of the user through the Internet; (b) displaying the Web page with at least one garment; (c) selecting at least one garment from the Web page; (d) determining a garment spatial configuration of the at least one garment; (e) altering the garment spatial configuration according to the initial digital image of the user to form an altered garment spatial configuration; and (f) forming a garment image of the at least one garment according to the altered garment spatial configuration together with the image of the user; and (g) displaying the garment image through the Internet.

Preferably, the step of altering the garment spatial configuration according to the initial digital image of the user further comprises the steps of: (i) determining a plurality of critical user adjustment points of the initial digital image of the user; (ii) determining a plurality of garment adjustment points of the garment spatial configuration; (iii) adjusting the plurality of garment adjustment points according to the critical user adjustment points.

More preferably, the at least one garment is available in a plurality of sizes, the step of determining the plurality of garment adjustment points is determined according to one of the plurality of sizes and the step of adjusting the plurality of garment adjustment points according to the critical user adjustment points is performed according to a transform of the plurality of garment adjustment points between the plurality of sizes.

Optionally and most preferably, the step of determining the plurality of critical user adjustment points further comprises the step of translating the plurality of critical user adjustment points to absolute measurements according to an independent calibration function.

Preferably, the step of providing the initial digital image of the body of the user further comprises the step of removing a background of the initial digital image to form an initial image of the user. More preferably, the formed garment image may be further enhanced by adjusting the lighting of the garment image to compensate for changes in lighting between the garment image and the user image. Most preferably, the adjusted garment image is altered to change the color or the pattern of the fabric of the garment.

Also preferably, the step of displaying the Web page with at least one garment further comprises the steps of: (i) selecting a category of garments according to at least one garment characteristic; and (ii) displaying a plurality of garments within the category of garments fulfilling the at least one garment characteristic.

Hereinafter, the term "Web site" refers to at least one Web page. A "Web page" is a document written in a mark-up language, including but not limited to HTML (Hypertext Mark-up Language), DHTML (dynamic HTML), VRML (Virtual Reality Modeling Language) and XML (Extended Mark-up Language), which is capable of being served by a Web server and viewed by a Web browser, as well as an image displayed on a television set received through a television channel. A Web server could be an HTTP server, for example. A Web browser is software which is capable of displaying a Web page through a GUI (graphical user interface) on a computer display screen or other display screen. Hereinafter the term "Internet" also includes a television channel.

Hereinafter, the term "computing platform" refers to a particular computer hardware system or to a particular software operating system. Examples of such hardware systems include, but are not limited to, personal computers (PC), Macintosh™ computers, mainframes, minicomputers, Web-top televisions, network PC and workstations. Examples of such software operating systems include, but are not limited to, UNIX, VMS, Linux, MacOS™, DOS, one of the Windows™ operating systems by Microsoft Inc. (Seattle, Wash., USA), including Windows NT™, Windows 3.x™ (in which "x" is a version number, such as "Windows 3.1™") and Windows95™.

For the present invention, a software application, whether a software object or substantially any other type of software application, could be written in substantially any suitable programming or scripting language, which could easily be selected by one of ordinary skill in the art. The programming or scripting language chosen should be appropriate for the computing platform according to which the software application is executed. Examples of suitable programming or scripting languages include, but are not limited to, C, C++, PERL, TCL, MatLab™ and Java.

Hereinafter, the terms "article of clothing" and "garment" are used interchangeably. Hereinafter, the term "garment" also includes, in addition to an article of clothing, eyeglasses, sunglasses, jewelry, and hair style or color. Hereinafter, the term "trying on" refers to the process of placing a garment on the body of an individual.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of a system and a method for fitting articles of clothing to an image of a user over the Internet. The image of the user is derived from a photograph or photographs of the user, from a videostream, and/or from additional information about the user. Critical points are taken from the image of the user, and are used to adjust the spatial configuration of the clothing. The critical points within the volume of the article of clothing are adjusted to match the critical points of the image of the body of the user, such that the spatial configuration of the article of clothing matches the configuration which would be adopted if the user was actually wearing the article of clothing. Thus, rather than first creating a model and then attempting to drape the image of the clothing over the model, the spatial configuration of the clothing alone is determined and adjusted to fit the body of each user.

Preferably, the process is performed substantially automatically, such that the user or any other human operator does not need to manually adjust the image of the body of the user, alone or wearing the article of clothing. However, certain information may need to be entered separately, for example the dimensions of the user if no calibration information is available from the image. Also preferably, a collection of stored images of articles of clothing, alone or more preferably in various combinations, is available on-line through the Internet, such that the user could access the collection through a Web site. The user could then "try on" various articles of clothing and select one or more from a vendor selling these articles of clothing through the Web site.

The principles and operation of the dressing system and method according to the present invention may be better understood with reference to the drawings and the accompanying description.

Figure 1:
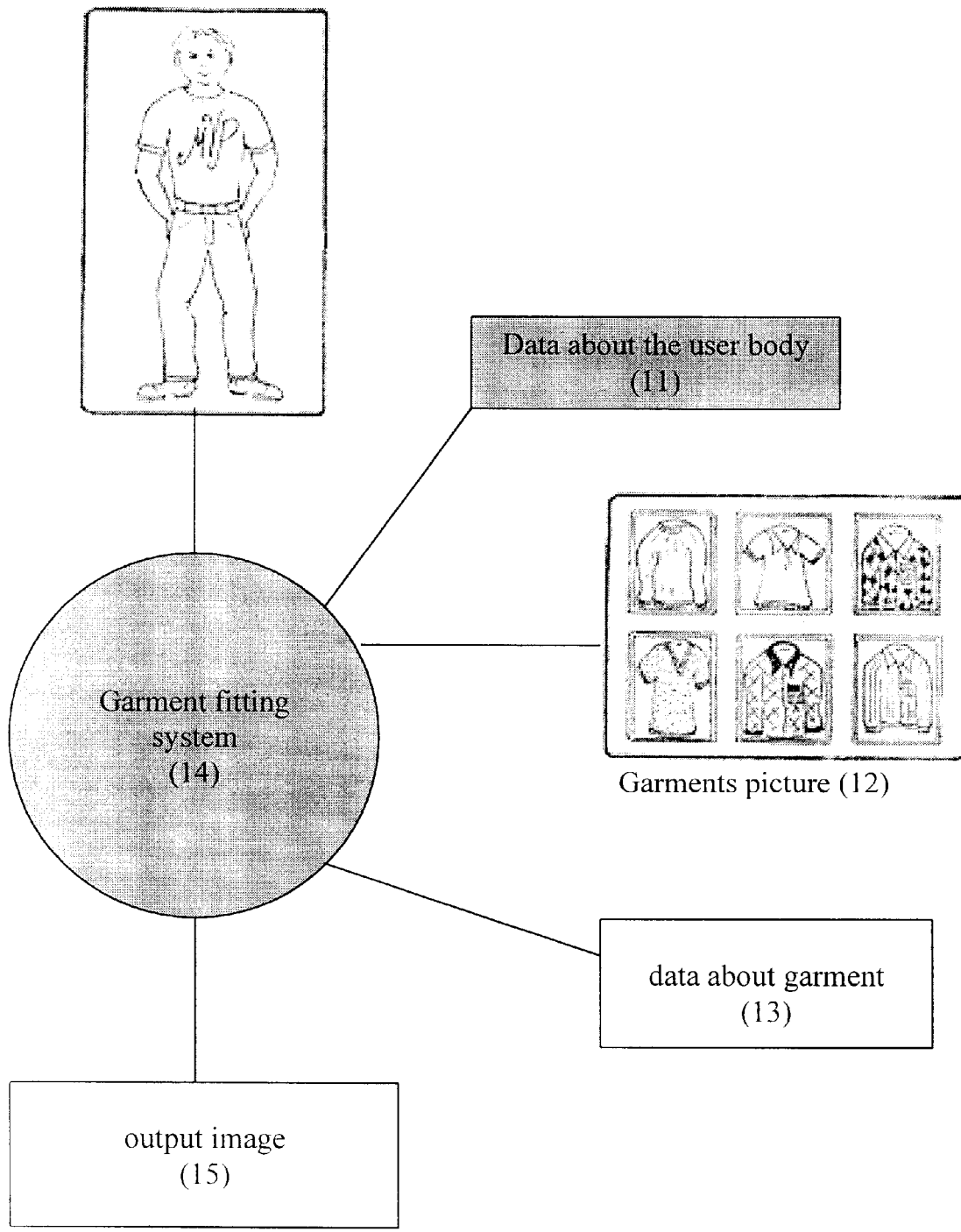
FIG. 1 is a schematic block diagram of an exemplary system of the present invention.

Referring now to the drawings, FIG. 1 is a schematic block diagram illustrating an exemplary system according to the present invention. A garment-fitting system 14, for fitting garments over the Internet, receives a number of different inputs. These inputs are then used to display an image of a garment as though the garment was being worn by the user. Thus, the user can "try on" the garment through the Internet. A user of garment-fitting system 14 could also supply an image of someone else for whom the user wished to purchase clothing, such as a child for example. Although the discussion will center upon garments being displayed over an image of the user, it is understood that this is for the purposes of discussion only and is not meant to be limiting in any way.

Garment-fitting system 14 receives an initial image 10 of the body of the user. Initial image 10 could be produced by scanning a photograph, for example. Initial image 10 could optionally and preferably include a plurality of few photographs, preferably of different angles or sides of the user. Also preferably, initial image 10 is a digital picture(s) of the user. Optionally and preferably, initial image 10 could be taken from a video stream which features the user.

Optionally and more preferably, the user may add some user data 11 about the body of the user. This data optionally includes, but is not limited to, height, chest size and waist size. This is preferably included if the user supplies only a single photograph, in order to permit such calculations as recommended garment size. These calculations require a full view of the body of the user. Therefore, in order for garment system 14 to recommend a garment size to the user, garment system 14 must either receive multiple images of the user in initial image 10, or else must receive user data 11.

Garment-fitting system 14 also receives at least one, and preferably a plurality of, garment pictures 12 from which the user selects the requested garment to "try on".

Preferably garment-fitting system 14 also receives additional garment data 13. Garment data 13 can include, for example, the available size, colors and fabric pattern of the garment from which the user may select a particular color, fabic pattern and/or size. In addition, preferably garment data 13 could include flexibility of the fabric of the garment, the extent to which the fabric tends to cling to the body of the wearer, and other information useful for adjusting the garment as it would appear on the body of the user while being worn by the user. The additional garment data 13 more preferably also includes pre-processed information about the garments such as the various sizes available, in order for the user to be able to view garments of two different sizes on an output image 15, which is an image of the garment on the user.

Figure 2:
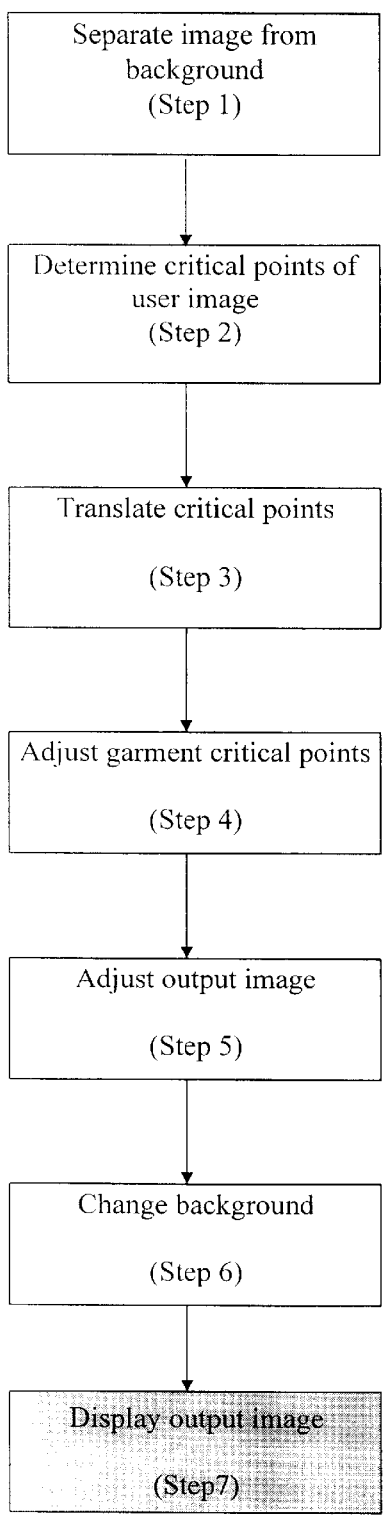
FIG. 2 is a flowchart of a method for placing an image of a garment on an image of the user according to the present invention.

The process for obtaining output image 15 of the garment on the user, as shown in FIG. 1, is described in further detail below with regard to FIG. 2. FIG. 2 shows a flowchart of an exemplary method for measuring the critical adjustment points on the initial image of the body of the user and for adjusting the garment to these points to form the output image. The process described below is generally suitable for either a three dimensional or a two dimensional output image 15. However, for a three dimensional output image 15 of garment on the user, multiple images of the user from a variety of sides and angles would need to be available.

In step 1, the initial image of the body of the user is separated from the background of the image.

In step 2, critical adjustment points are located on the image of the body of the user. Preferably, feature extraction techniques are used to find fixed critical adjustment points on the image. These techniques include both techniques for finding object outlines (for example, see "An Unbiased Detector of Curvilinear Structures", by Carsten Steger, *IEEE Transactions on Pattern Analysis and Machine Intelligence*, 20(2):113–125, 1998) and techniques for analyzing textures using wavelets ("Characterization of texture by eigenfilter", by F. Aide, *Signal Processing*, 5(5):451–457, 1983). Examples of the critical adjustment points could include, but are not limited to elbows, hips and waist. In addition, points within the body of the user, such as center of the stomach, throat, and bust could be found.

In step 3, the critical adjustment points are translated from pixel measurements in the image to absolute size measurements in some unit of measure such as centimeters or inches. Such a translation, or calibration function, is possible only if an absolute measure of length can be reliably found in the photograph, or if the user supplies an independent measure that can be correlated to one in the image. Examples of such absolute measures within the image include, but are not limited to, an object of known size, such as a piece of paper, attached to the wall behind the user. Examples of independent measures include, but are not limited to, the height of the user. Preferably the translation compensates for the optical aberrations caused by the digitization process, which cause pixels at the edge of the image to be larger than pixels at the center.

In step 4, the critical points of the garment are adjusted to match the critical points from the initial image of the user. Preferably, this step of adjustment is performed according to the discrete size transforms between different sizes of the actual garment, such that the spatial configuration of the adjusted garment conforms to a possible size of the actual garment itself.

In step 5, preferably the output image is adjusted to improve its overall appearance before being displayed. For instance, the apparent lighting on the garment image could be matched to the apparent lighting on the user image. The direction of lighting can be analyzed by translating the image into HSV (Hue, Saturation and intensity (V)) color space, finding a flat area of the user image (for instance the center of the stomach), and determining the differences in the V component as compared to angled areas (for instance the sides of the body of the user). Once the lighting direction has been determined, ray tracing techniques can be used to adjust the original image to the desired state. Additionally, the color of the garment can be adjusted according to a palette presented to the user of possible garment colors. Here again the HSV garment image is adjusted so that the H and S components match properly.

In step 6, the background of the output image is then optionally and preferably changed, for example to a color scheme which complements the color of the garment.

In step 7, the final output image is then displayed to the user on a GUI (graphical user interface). The output image is a composite image of the garment dressed on the image of the user.

Figure 3:
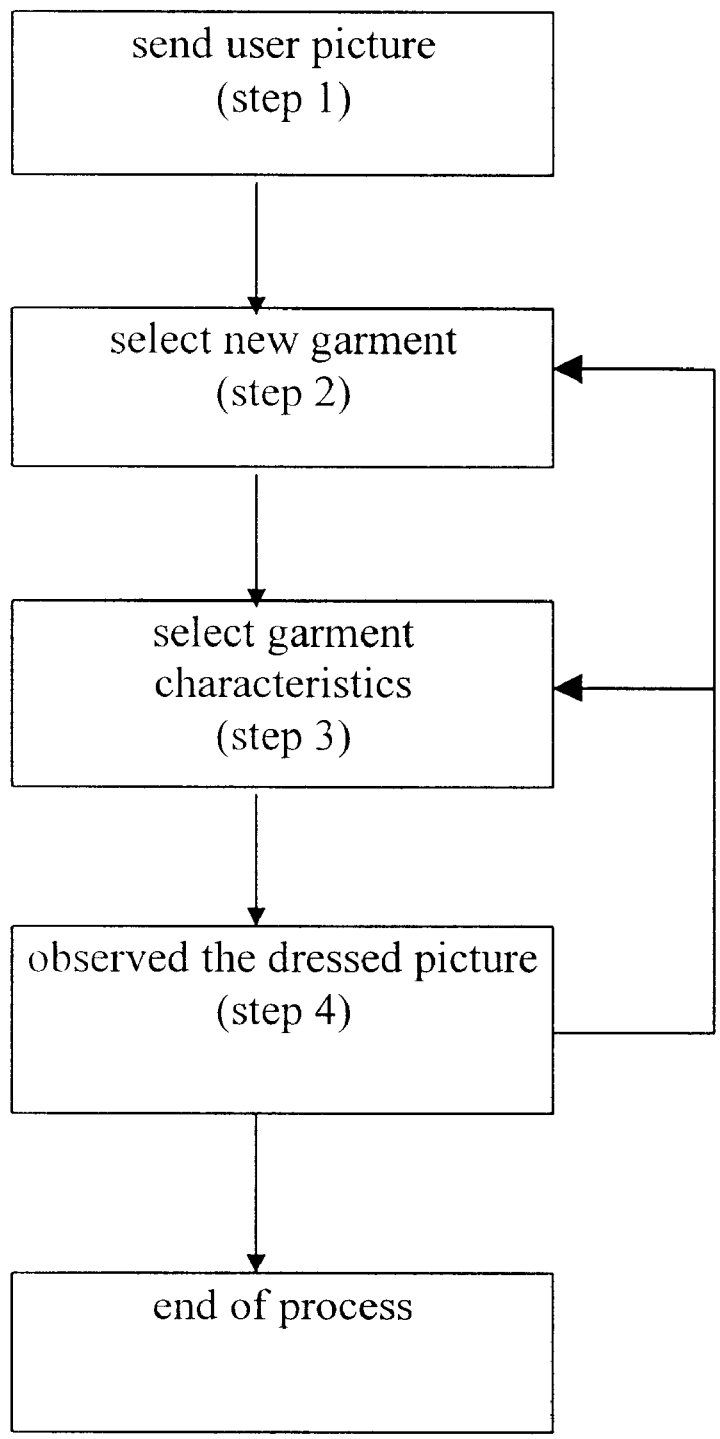
FIG. 3 is a flowchart of a method for trying on garments over the Internet according to the present invention.

FIG. 3 shows a particularly preferred embodiment of the present invention, which is an exemplary method for displaying garments for purchase over the Internet.

In step 1, the user sends a picture of the body of the user to the vendor of garments over the Internet. As noted previously, optionally the picture could be of someone else, such as a child for example, for whom the user wishes to purchase clothing. The picture can be sent to the vendor in several forms. For example, a printed picture could be sent via the regular postal service to a service center. The picture would then be scanned and submitted to the web site of the vendor.

Alternatively and preferably, users who have the ability to scan printed pictures or have a digital camera for obtaining digital still images, could send their pictures to the vendor web site over the Internet.

Also alternatively and preferably, users who have the ability to connect a video camera to their computer could enter the vendor web site, stand opposite their video camera and be photographed. The camera could be any type of suitable video camera, including but not limited to, a home video camera, a video conference camera and a digital video camera. The picture of the user, which would be a captured picture if a analog video camera was used, is then sent to the vendor web site over the Internet.

Step 1 is finished when the user selects a requested image to dress. Optionally and preferably, depending upon the policy of the vendor, the user may be registered in the vendor web site data base, with proper precautions to protect the privacy of the user. More preferably, the user must furnish some type of identification information, such as a password, before entering the vendor web site.

In step 2, the user selects at least one garment from a GUI (graphical user interface) which is preferably a Web page. The GUI displays different garments which are optionally organized into different categories, including but not limited to, clothing for men, women, boys, girls or babies; seasonally appropriate clothing; types of clothing such as dresses, shirts or pants; different clothing manufactures; or styles of clothing such as formal or casual.

In step 3, the user optionally selects or change garment characteristics if available. Such characteristics could include but are not limited to the size of the garment, the color of the garment and the fabric of the garment.

In step 4, the user views the displayed output image of the garment on the image of the user, and optionally decides whether to try on the same garment with different characteristics, by returning to step 3; to try on a new garment, by returning to step 2; or to end the process of trying on garments.

Although the preceding discussion centered upon the process of trying on garments through the Internet at the web site of a vendor, the described process could also be performed by a user operating a console in a store. This console would optionally and preferably be an independent, stand-alone device, which would display a GUI which is optionally and preferably similar to the web page described previously.

While the invention has been described with respect to a limited number of embodiments, it will be appreciated that many variations, modifications and other applications of the invention may be made.

What is claimed is:

1. A method for trying on a garment by a user through a Web page on the Internet, the steps of the method being performed according to software commands being executed by a data processor, the method comprising the steps of:
   (a) transforming a picture of a body of the user into an initial digital image of the user;
   (b) displaying the Web page with at least one garment;
   (c) selecting at least one garment from the Web page to form a selected garment;
   (d) determining a garment spatial configuration of said at least one garment;
   (e) altering said garment spatial configuration according to said initial digital image of the user to form an altered garment spatial configuration;
   (f) forming a composite image of said selected garment by dressing said selected garment on said initial digital image of the user according to said altered garment spatial configuration; and
   (g) displaying said composite image on the Web page through the Internet;
   wherein said picture of a body of the user is derived from the group consisting of at least one photograph of the user, a videostream of the user, and additional information about the user.

2. The method of claim 1, wherein the step of altering said garment spatial configuration according to said initial digital image of the user further comprises the steps of:
   (i) determining a plurality of critical user adjustment points of said initial digital image of the user;
   (ii) determining a plurality of garment adjustment points of said garment spatial configuration;
   (iii) adjusting said plurality of garment adjustment points according to said critical user adjustment points.

3. The method of claim 2, wherein said at least one garment is available in a plurality of sizes, the step of determining said plurality of garment adjustment points is determined according to one of said plurality of sizes and the step of adjusting said plurality of garment adjustment points according to said critical user adjustment points is performed according to a transform of said plurality of garment adjustment points between said plurality of sizes.

4. The method of claim 3, wherein the step of determining said plurality of critical user adjustment points further comprises the step of translating said plurality of critical user adjustment points to absolute measurements according to an independent calibration function.

5. The method of claim 4, wherein the step of translating said plurality of critical user adjustment points uses an absolute measure of length from said picture of the body of the user.

6. The method of claim 4, wherein the step of translating said plurality of critical user adjustment points uses an independent measure correlated to a measure from said picture of the body of the user.

7. The method of claim 6, wherein said independent measure is a dimension of the body of the user.

8. The method of claim 1, wherein the step of transforming said picture of the body of the user into said initial digital image of the body of the user comprises the step of removing a background of said picture to form an initial image of the user.

9. The method of claim 1, wherein said picture is selected from the group consisting of at least one printed photograph, a digital still image and a videostream.

10. The method of claim 1, wherein the step of forming said composite image includes the step of adjusting a lighting of said garment image to compensate for a change in lighting between said composite image and said picture of the body of the user.

11. The method of claim 10, wherein the step of forming said composite image further includes the step of altering said composite image to change a characteristic of said selected garment.

12. The method of claim 11, wherein said characteristic is selected from the group consisting of a color, a pattern and a fabric of said selected garment.

13. The method of claim 1, wherein the step of displaying the Web page with at least one garment further comprises the steps of:
   (i) selecting a category of garments according to at least one garment characteristic; and
   (ii) displaying a plurality of garments within said category of garments fulfilling said at least one garment characteristic.

* * * * *